United States Patent [19]

Ito et al.

[11] 3,853,923
[45] Dec. 10, 1974

[54] 2-SUBSTITUTED-(2-HYDROXY-3-LOWER ALKAMINOPROPOXY)-BENZOFURANS

[75] Inventors: Kiyoshi Ito, Otsu; Masahiko Ikemoto, Honmachi; Kazuhiko Kimura, Otsu; Teruo Nakanishi, Kyoto, all of Japan

[73] Assignee: Kakenyaku Kako Co., Ltd., Tokyo, Japan

[22] Filed: May 8, 1972

[21] Appl. No.: 251,454

[30] Foreign Application Priority Data
May 13, 1971 Japan............................ 46-32145
July 14, 1971 Japan............................ 46-52333
Oct. 28, 1971 Japan............................ 46-86109
Jan. 6, 1972 Japan............................ 47-4395

[52] U.S. Cl.......... 260/346.2 R, 260/340.9, 424/285
[51] Int. Cl............................................. C07d 5/42
[58] Field of Search............................ 260/346.2 R

[56] References Cited
UNITED STATES PATENTS
3,340,266  9/1967  Howe et al................. 260/346.2 R Primary Examiner—John D. Randolph
Assistant Examiner—Bernard Dentz
Attorney, Agent, or Firm—Clelle W. Upchurch

[57] ABSTRACT

Benzofuran derivatives of the general formula:

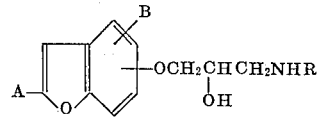

and their pharmaceutically acceptable acid addition salts having superior pharmacological activities for diseases in circulatory system or peripheral nervous system, and method for the preparation of the said benzofuran derivatives.

21 Claims, No Drawings

2-SUBSTITUTED-(2-HYDROXY-3-LOWER ALKAMINOPROPOXY)-BENZOFURANS

The present invention relates to novel benzofuran derivatives and their pharmaceutically acceptable acid addition salt, and further to methods for the preparation thereof and pharmaceutical composition containing the benzofuran derivatives.

There hitherto have been known many kinds of medicaments for treating diseases in circulatory system but has still been desired further superior medicament.

It has been researched to find out other compounds useful for treating diseases in circulatory system. As a result, it has now been found out that some novel benzofuran derivatives and their pharmaceutically acceptable acid addition salts possess superior pharmacological activities.

An object of the present invention is to provide novel benzofuran derivatives and their pharmaceutically acceptable acid addition salts.

Another object of the invention is to provide methods for preparing the said novel benzofuran derivatives and their pharmaceutically acceptable acid addition salts.

A further object of the invention is to provide a pharmaceutical composition containing the said benzofuran derivatives and their pharmaceutically acceptable acid addition salts.

These and other objects will more clearly appear hereinafter.

The novel benzofuran derivatives of the present invention can be illustrated by the general formula (I):

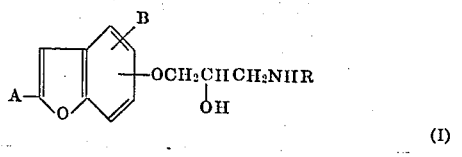

(I)

wherein A is —COR′,

or ethyl group; B is hydrogen atom when A is —COR′ or

or —COR″ substituted at 3 or 4 position of benzofuran nucleus when A is ethyl group; R is an alkyl group having 1 to 5 carbon atoms; R′ is an alkyl group having 1 to 4 carbon atoms, an alkoxy group having 1 to 3 carbon atoms or phenyl group; R″ is an alkyl group having 1 to 4 carbon atoms, phenyl group or phenylalkyl group wherein the alkyl moiety has 1 to 2 carbon atoms; and the group

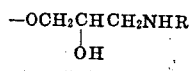

is substituted at 3,4,5,6 or 7 position of benzofuran nucleus.

Suitable examples of the group —COR′ are an alkanoyl group wherein the alkyl moiety means a straight or branched alkyl group having 1 to 4 carbon atoms, such as methyl, ethyl, propyl, isopropyl, butyl, isobutyl, secondary butyl or tertiary butyl; an alkoxycarbonyl group wherein the alkoxy moiety means an alkoxy group having 1 to 3 carbon atoms, such as methoxy, ethoxy or propoxy; and benzoyl group. Suitable examples of the group —COR″ are an alkanoyl group wherein the alkyl moiety means a straight or branched alkyl group having 1 to 4 carbon atoms, such as methyl, ethyl, propyl, isopropyl, butyl or isobutyl; benzoyl group; and a phenylalkanoyl group wherein the alkyl moiety means an alkyl group having 1 to 2 carbon atoms, such as methyl or ethyl. The alkyl group defined as R is a straight or branched alkyl group having 1 to 5 carbon atoms, such as methyl, ethyl, propyl, isopropyl, butyl, isobutyl, secondary butyl, tertiary butyl or amyl, preferably a branched alkyl group having 3 to 4 carbon atoms, such as isopropyl, isobutyl, secondary butyl or tertiary butyl.

Suitable examples of the present benzofuran derivatives are 2-acetyl-7-(2-hydroxy-3-isopropylaminopropoxy)benzofuran, 2-acetyl-7-(2-hydroxy-3-tertiary butylaminopropoxy)benzofuran, 2-acetyl-4-(2-hydroxy-3-tertiary butylaminopropoxy)-benzofuran, 2-carbethoxy-7-(2-hydroxy-3-isopropylaminopropoxy)benzofuran, 2-benzoyl-7-(2-hydroxy-3-isopropylaminopropoxy)benzofuran, 2-acetyl-5-(2-hydroxy-3-isopropylaminopropoxy)benzofuran, 2-acetyl-3-(2-hydroxy-3-tertiary butylaminopropoxy)benzofuran, 2-acetyl-6-(2-hydroxy-3-tertiary butylaminopropoxy)benzofuran, 2-acetyl-7-(2-hydroxy-3-secondary butylaminopropoxy)-benzofuran, 2-ethyl-4-acetyl-7-(2-hydroxy-3-isopropylaminopropoxy)benzofuran, 2-ethyl-4-acetyl-7-(2-hydroxy-3-tertiary butylaminopropoxy)benzofuran, 2-ethyl-4-propionyl-7-(2-hydroxy-3-isopropylaminopropoxy)benzofuran, 2-ethyl-4-propionyl-7-(2-hydroxy-3-secondary butylaminopropoxy)benzofuran, 2-ethyl-4-benzoyl-7-(2-hydroxy-3-isopropylaminopropoxy)benzofuran, 2-ethyl-4-benzoyl-7-(2-hydroxy-3-tertiary butylaminopropoxy)benzofuran, 2-ethyl-4-phenylacetyl-7-(2-hydroxy-3-isopropylaminopropoxy)-benzofuran, 2-ethyl-4-phenylacetyl-7-(2-hydroxy-3-secondary butylaminopropoxy)benzofuran, 2-ethyl-4-acetyl-5-(2-hydroxy-3-tertiary butylaminopropoxy)-benzofuran, 2-ethyl-4-benzoyl-5-(2-hydroxy-3-isopropylaminopropoxy)benzofuran, 2-ethyl-3-acetyl-7-(2-hydroxy-3-tertiary butylaminopropoxy)-benzofuran, 2-ethyl-3-acetyl-5-(2-hydroxy-3-tertiary butylaminopropoxy)benzofuran, 2-(1-isopropylimino)ethyl-7-(2-hydroxy-3-isopropylaminopropoxy)benzofuran, 2-(1-isopropylimino)ethyl-4-(2-hydroxy-3-isopropylaminopropoxy)-benzofuran, 2-(1-secondary butylimino)ethyl-4-(2-hydroxy-3-secondary butylaminopropoxy)benzofuran, 2-(1-isopropylimino)-ethyl-5-(2-hydroxy-3-isopropylaminopropoxy)benzofuran, 2-(1-secondary butylimino)ethyl-6-(2-hydroxy-3-secondary butylaminopropoxy)benzofuran and 2-(1-amylimino)ethyl-5-(2-hydroxy-3-amylaminopropoxy)benzofuran. Most suitable examples are 2-acetyl-7-(2-hydroxy-3-isopropylaminopropoxy)benzofuran, 2-acetyl-7-(2-hydroxy-3-tertiary butylaminopropoxy)benzofuran, 2-carbethoxy-7-(2-hydroxy-3-isopropylaminopropoxy)-benzofuran, 2-benzoyl-7-(2-hydroxy-3-isopropylaminopropoxy)benzofuran, 2-acetyl-7-(2-hydroxy-3-secondary butylaminopropoxy)benzofuran, 2-acetyl-4-(2-hydroxy-3-tertiary butylaminopropoxy)- benzofuran, 2-(1-isopropylimino)ethyl-7-(2-hydroxy-3-isopropylaminopropoxy)-benzofuran and 2-(1-isopropylimino)ethyl-4-(2-hydroxy-3-isopropylaminopropoxy)benzofuran.

A method for the preparation of the present benzofuran derivatives (I) can be illustrated as follows:

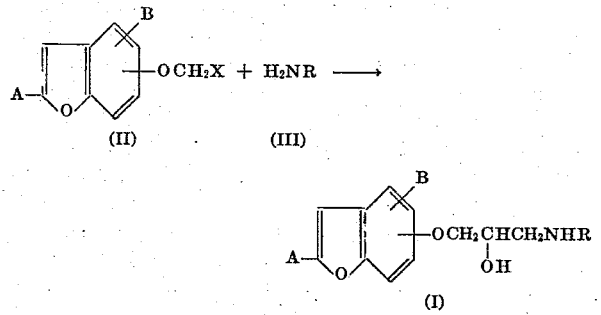

wherein X is

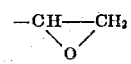

or

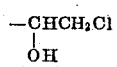

and A, B and R are the same as defined above.

In the above method, an alkoxybenzofuran derivative (II) is reacted with a primary amine (III) to give the desired benzofuran derivative (I). The reaction can be carried out at a room temperature, or at an elevated temperature, optionally under a pressure, in a suitable organic solvent such as methanol, ethanol, benzene or toluene. The reaction temperature is usually about 60° to about 110°C. and the reaction period is about 10 minutes to 10 several hours, preferably about 20 minutes to about 10 hours. When A in the starting alkoxybenzofuran derivative (II) is —COR' and the reaction condition is severe, for instance, the reaction is carried out under a pressure, e.g. 2 to 50 atmospheres, preferably 3 to 10 atmospheres for a relatively long period, e.g. 10 to 15 hours, the group —COR' is also reacted with the primary amine (III) to give a group

While the reaction can be carried out at an ordinary pressure when the reaction period is longer, it is preferable to carry out under a pressure. If the starting alkoxybenzofuran derivative (II) wherein X is

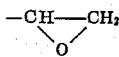

is used, it is preferably carried out in the presence of a mineral acid such as hydrochloric acid.

The primary amine (III) may be theoretically used in an amount of about one mole for the purpose of preparing the benzofuran derivative (I) wherein A is —COR' or ethyl group or about 2 moles for the purpose of preparing the benzofuran derivative (I) wherein A is

per one mole of the alkoxybenzofuran derivative (II), but it is preferable to use excess amount of the primary amine (III) which functions both as reactant and solvent.

In the above method there may be used, instead of an alkoxybenzofuran derivative (II), hydroxybenzofuran derivative (IV) and epichlorohydrin (V). That is, the reaction may be also carried out by heating a mixture of hydroxybenzofuran derivative (IV), epichlorohydrin (V) and primary amine (III) at about 60° to about 110°C. for 10 minutes to 10 several hours in a suitable solvent such as water, methanol, ethanol, dioxane, acetone, N,N-dimethylformamide or a mixture thereof.

The starting alkoxybenzofuran derivative (II) can be prepared by the following method:

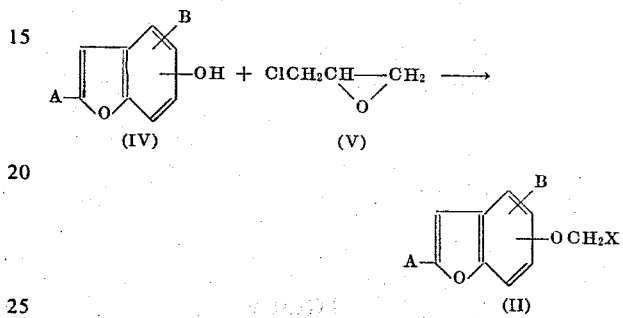

wherein A, B and X are the same as defined above.

In the method, a hydroxybenzofuran derivative (IV) is reacted with epichlorohydrin (V) to give an alkoxybenzofuran derivative (II). The reaction can be carried out by heating the reactants, optionally under a pressure, preferably in the presence of a catalyst selected from the group consisting of secondary or tertiary amines and mineral acid salts thereof; e.g. dimethylamine, diethylamine, trimethylamine, triethylamine, piperidine, pyridine, and the like. The reaction temperature is 50° to 120°C., preferably 100° to 110°C. and the reaction period is several tens minutes to 10 several hours, preferably 1 to 5 hours. The reaction can be carried out without solvent, but if necessary, in a suitable organic solvent such as ethanol or N,N-dimethylformamide. According to the above reaction, (2,3-epoxypropoxy)-benzofuran derivative (X is a group

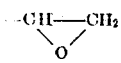

is mainly obtained and a small amount of (2-hydroxy-3-chloro)-propoxybenzofuran derivative (X is a group

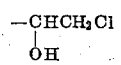

is optionally mixed with (2,3-epoxypropoxy)benzofuran derivative, but the mixture as it is can be used for the subsequent reaction. If desired, the (2,3-epoxypropoxy)benzofuran derivative can be readily converted into (2-hydroxy-3-chloro) propoxybenzofuran derivative by treating with hydrochloric acid in a suitable organic solvent such as chloroform.

The hydroxybenzofuran derivative (IV) wherein B is —COR" is a novel compound and can be readily prepared by reacting 2-ethyl-hydroxybenzofuran, in which the hydroxyl group is protected by an acyl group or a lower alkyl group, with a conventional acylating agent such as acid chloride or acid anhydride in a suitable organic solvent such as carbon disulfide, nitroethane or nitrobenzene in a presence of a catalyst such as Lewis acid, e.g. anhydrous aluminum chloride or anhydrous tin tetrachloride to introduce an acyl group at 3 or 4 position of benzofuran nucleus and removing the acyl group or alkyl group substituted on hydroxyl group by a conventional method, for example, by treating the resultant with alkali metal hydroxide, or with anhydrous aluminum chloride or anhydrous tin tetrachloride.

Alternatively, the present benzofuran derivative (I) can be also prepared by the following methods:

1. 2-alkanoyl-7-(2-hydroxy-3-aminopropoxy)benzofuran is reacted with an alkyl halide at about 60° to about 100°C. for a few hours to 10 several hours in a suitable solvent such as methanol or ethanol.

2. 2-alkanoyl-7-hydroxybenzofuran or its alkali metal salt is reacted with 1-alkylamino-3-chloro-2-propanol at about 70° to about 100°C., optionally under a pressure for several hours to several tens hours.

3. 3-alkyl-5-(2-alkanoyl-7-benzofuranoxymethyl)-oxazolidine or its 2-phenyl derivative is treated with an acid such as hydrochloric acid or an alkali metal hydroxide such as sodium hydroxide at about 70° to about 150°C. for several tens minutes to several hours.

4. 2-alkanoyl-7-[2-hydroxy-3-(N-acyl-N-alkyl)-aminopropoxy)benzofuran is treated with an acid such as hydrochloric acid at about 70° to about 80°C. for a few hours to several hours.

5. 2-(1-ethylenedioxy)ethyl-7-(2-oxo-3-alkylaminopropoxy)benzofuran is reduced by a reducing agent such as lithium aluminum hydride, sodium borohydride or hydrogen gas-palladium catalyst or hydrogen gas-platinum catalyst at a room temperature for several tens minutes to a few hours and then the resultant is hydrolyzed with an acid such as hydrochloric acid.

6. 2-(1-ethylenedioxy)ethyl-7-[2-hydroxy-3-(N-benzyl-N-alkyl)aminopropoxy]benzofuran is reduced by hydrogen gas-palladium catalyst at a room temperature and then the resultant is hydrolyzed with an acid such as hydrochloric acid.

7. 2-(1-ethylenedioxy)ethyl-7-(2-hydroxy-3-aminopropoxy)benzofuran, 2-(1-ethylenedioxy)ethyl-7-(2-oxo-3-hydroxyiminopropoxy)benzofuran or 2-(1-ethylenedioxy)-ethyl-7-(2-cyano-2-hydroxyethoxy)-benzofuran is reacted with a ketone such as acetone at a lower temperature or at a room temperature under a condition of reduction, for instance, in the presence of a reducing agent such as lithium aluminum hydride or sodium borohydride or with adding hydrogen gas in the presence of a catalyst such as palladium or platinum and then the resultant is hydrolyzed with an acid such as hydrochloric acid.

8. 2-(1-ethylenedioxy)ethyl-7-(2,3-dioxopropoxy)-benzofuran is reacted with a primary amine at a lower temperature under a condition of reduction as mentioned in item (7) and then the resultant is hydrolyzed with an acid such as hydrochloric acid.

When the present benzofuran derivatives (I) prepared by the above method are a free base, they can be readily converted into their pharmaceutically acceptable acid addition salts by a conventional method, e.g. by treating the free base with an acid, if necessary, in a suitable organic solvent such as methanol or ethanol. The acid may be an inorganic acid such as hydrochloric acid, sulfuric acid or nitric acid or an organic acid such as oxalic acid, acetic acid, succinic acid, malic acid, maleic acid, tartaric acid or tannic acid. In the present invention the benzofuran derivatives (I) can be racemic, dextro- or levo-form.

The benzofuran detivatives (I) and their pharmaceutically acceptable acid addition salts of the invention possess superior pharmacological activities for diseases in circulatory system or peripheral nervous system, for instance, they show superior β-adrenergic blocking activity and local anesthetic acitvit, and on the other hand they show low toxicity. Therefore, they are useful as medicaments, especially for prevention and treatment of heart diseases such as cardiac arrhythmias and angina pectoris and of hypertension.

The present benzofuran derivatives (I) and their pharmaceutically acceptable acid addition salts can be administered in parenteral or oral route by conventional methods with conventional pharmaceutical carriers in humans and animals. Oral administration by the use of tablets, capsules, powders or in liquid form such as suspensions, solutions, emulsions or syrups in particularly advantageous.

The preparation of the present benzofuran derivatives and their pharmaceutically acceptable acid addition salts is illustrated by the following examples.

EXAMPLE 1

To 8.8 g. of 2-acetyl-7-hydroxybenzofuran were added 80 ml. of epichlorohydrin and 0.2 g. of piperidine hydrochloride and the mixture was heated at 105°C. for 3 hours. After the reaction, the excess of epichlorohydrin was evaporated and the resultant was distilled under a reduced pressure to give 9.3 g. of 2-acetyl-7-(2,3-epoxypropoxy)benzofuran having a boiling point of 175°–6°C./0.7 mmHg. 6 g. of the above product was dissolved in 30 ml. of ethanol and to the solution was added 10 ml. of isopropylamine. After refluxing the mixture for 40 minutes, the solvent was evaporated from the reaction mixture. The resulting residue was recrystallized from cyclohexane-acetone to give 6 g. of 2-acetyl-7-(2-hydroxy-3-isopropylaminopropoxy)benzofuran having a melting point of 115°C.

The product obtained was dissolved in 10 ml. of 3 N hydrochloric acid and thereto 50 ml. of ethanol was added. The mixture was heated under a reduced pressure and the solvent was evaporated. The resulting residue was recrystallized from ethyl acetate to give its hydrochloride having a melting point of 163°C.

Analysis for $C_{16}H_{21}O_4N \cdot HCl$:
Calcd. (%): C 58.62, H 6.76, N 4.27;
Found (%): C 58.32, H 6.92, N 4.07.

EXAMPLE 2

In 50 ml. of ethanol was dissolved 6 g. of 2-acetyl-7-(2,3-epoxypropoxy)benzofuran having a boiling point of 175°–6°C./0.7 mmHg prepared in the same manner as described in Example 1 and thereto 10 ml. of tert.-butylamine was added. After refluxing the mixture for 40 minutes, the solvent was evaporated. The resulting residue was recrystallized from cyclohexane to give 6.3 g. of 2-acetyl-7-(2-hydroxy-3-tert.-butylaminopropoxy)-benzofuran having a melting point of 120°C.

The product obtained was converted into its hydrochloride having a melting point of 178°C. in the same manner as described in Example 1.

Analysis for $C_{17}H_{23}O_4N \cdot HCl$:
Calcd. (%): C 59.73, H 7.08, N 4.10;
Found (%): C 59.86, H 6.90, N 3.95.

EXAMPLE 3

To 3 g. of 2-acetyl-4-hydroxybenzofuran were added 30 ml. of epichlorohydrin and 150 mg. of piperidine hydrochloride and the mixture was heated at 105°C. for 2 hours. After the reaction, the excess of epichlorohydrin was evaporated. The resulting residue was recrystallized from petroleum ether-ethanol to give 3 g. of 2- acetyl-4-(2,3-epoxypropoxy)benzofuran having a melting point of 103°C. 1.2 g. of the product thus obtained was dissolved in 12 ml. of ethanol and thereto was added 5 ml. of tert.-butylamine. The mixture was refluxed for 1 hour. The solvent was evaporated from the reaction mixture to give 1.5 g. of crude 2-acetyl-4-(2-hydroxy-3-tert.-butylaminopropoxy)benzofuran. The product thus obtained was converted into 1.3 g. of its hydrochloride having a melting point of 232°C. in the same manner as in Example 1.

Analysis for $C_{17}H_{23}O_4N \cdot HCl$:
Calcd. (%): C 59.73, H 7.08, N 4.10;
Found (%): C 59.68, H 7.16, N 4.20.

EXAMPLE 4

To 1.2 g. of 2-carbethoxy-7-hydroxybenzofuran were added 30 ml. of epichlorohydrin and 120 mg. of piperidine hydrochloride. The mixture was heated at 110°C. for 2 hours. After the reaction, the excess of epichlorohydrin was evaporated and the residue was distilled to give 1.2 g. of 2-carbethoxy-7-(2,3-epoxypropoxy)-benzofuran having a boiling point of 175°–178°C./0.7 mmHg. 0.5 g. of the product thus obtained was dissolved in 5 ml. of ethanol and thereto was added 20 ml. of isopropylamine. The mixture was refluxed for 1 hour and then the solvent was evaporated from the reaction mixture to give 0.5 g. of crude 2-carbethoxy-7-(2-hydroxy-3-isopropylaminopropoxy)-benzofuran. The crude product was recrystallized from cyclohexane-acetone to give a purified product having a melting point of 109°C.

The product thus obtained was converted into 0.4 g. of its hydrochloride having a melting point of 133°C. in the same manner as described in Example 1.

Analysis for $C_{17}H_{23}O_5N \cdot HCl$:
Calcd. (%): C 57.06, H 6.76, N 3.92;
Found (%): C 57.23, H 6.85, N 3.80.

EXAMPLE 5

To 2.4 g. of 2-benzoyl-7-hydroxybenzofuran were added 30 ml. of epichlorohydrin and 150 mg. of piperidine hydrochloride. The mixture was refluxed for 3 hours. After the reaction, the excess of epichlorohydrin was evaporated. After collecting the materials dissolved into ether from the residue, the ether was evaporated to give 2.2 g. of 2-benzoyl-7-(2,3-epoxypropoxy)-benzofuran as an oily substance. To the product thus obtained were added 30 ml. of ethanol and 3 g. of isopropylamine. After refluxing the mixture for 30 minutes, the solvent was evaporated. The resulting residue was recrystallized from a small amount of ether to give 2 g. of 2-benzoyl-7-(2-hydroxy-3-isopropylaminopropoxy)benzofuran having a melting point of 107°C.

Analysis for $C_{21}H_{23}O_4N$:
Calcd. (%): C 71.39, H 6.56, N 3.96;
Found (%): C 71.21, H 6.43, N 4.17.

EXAMPLE 6

To 2.3 g. of 2-acetyl-5-(2,3-epoxypropoxy)-benzofuran which was prepared by using 2-acetyl-5-hydroxybenzofuran and epichlorohydrin in the same manner as described in Example 3 were added 20 ml. of ethanol and 5 ml. of isopropylamine. The mixture was refluxed for 40 minutes and then the excess of isopropylamine and ethanol were evaporated. To the resulting residue were added 5 ml. of diluted hydrochloric acid and further ethanol. The mixture was distilled under a reduced pressure. The residue was recrystallized from ethyl acetate-ethanol to give 2.5 g. of 2-acetyl-5-(2-hydroxy-3-isopropylaminopropoxy)benzofuran hydrochloride having a melting point of 175°C.

Analysis for $C_{16}H_{21}O_4N \cdot HCl$:
Calcd. (%): C 58.62, H 6.76, N 4.27;
Found (%): C 58.41, H 6.95, N 4.03.

EXAMPLE 7

In 10 ml. of ethanol was dissolved 0.7 g. of 2-acetyl-7-(2,3-epoxypropoxy)benzofuran prepared in the same manner as described in Example 1 and thereto was added 1 g. of sec.-butylamine. After refluxing the mixture for 30 minutes, the solvent was evaporated. The resulting residue was recrystallized from cyclohexane-acetone to give 0.8 g. of 2-acetyl-7-(2-hydroxy-3-sec.-butylaminopropoxy)benzofuran having a melting point of 82°C.

Analysis for $C_{17}H_{23}O_4N$:
Calcd. (%): C 66.86, H 7.59, N 4.59;
Found (%): C 66.74, H 7.62, N 4.47.

EXAMPLE 8

To 10 g. of 2-acetyl-3-hydroxybenzofuran were added 50 ml. of epichlorohydrin and 50 mg. of piperidine hydrochloride. The mixture was refluxed for 3 hours and the excess of epichlorohydrin was evaporated. The resulting residue was recrystallized from ethanol to give 6.5 g. of 2-acetyl-3-(2,3-epoxypropoxy)benzofuran having a melting point of 105.5°C. 2.2 g. of the product thus obtained was dissolved in 10 ml. of ethanol and thereto was added 4 g. of tert.-butylamine. After refluxing the mixture for 30 minutes, the solvent was evaporated under a reduced pressure. The resulting residue was recrystallized from cyclohexane to give 2 g. of 2-acetyl-3-(2-hydroxy-3-tert.-butylaminopropoxy)benzofuran having a melting point of 106.5°C.

Analysis for $C_{17}H_{23}O_4N$:
Calcd. (%): C 66.86, H 7.59, N 4.59;
Found (%): C 66.93, H 7.82, N 4.44.

EXAMPLE 9

To 1.8 g. of 2-acetyl-6-hydroxybenzofuran were added 20 ml. of epichlorohydrin and 100 mg. of piperidine hydrochloride. After refluxing the mixture for 4 hours, the excess of epichlorohydrin was evaporated. The resulting residue was recrystallized from ether-petroleum ether to give 1.2 g. of 2-acetyl-6-(2,3-epoxypropoxy)-benzofuran having a melting point of 91°C. 0.5 g. of the product thus obtained was dissolved in 5 ml. of ethanol and thereto was added 1 g. of tert.-butylamine. After refluxing the mixture for 30 minutes, the solvent was evaporated. The resulting residue was recrystallized from cyclohexane-acetone to give 0.45 g. of 2-acetyl-6-(2-hydroxy-3-tert.-butylaminopropoxy)-benzofuran having a melting point of 118°C.

Analysis for $C_{17}H_{23}O_4N$:
Calcd. (%): C 66.86, H 7.59, N 4.59;
Found (%): C 66.65, H 7.71, N 4.63.

EXAMPLE 10

In 10 ml. of epichlorohydrin was dissolved 1 g. of 2-ethyl-4-acetyl-7-hydroxybenzofuran and thereto was added 50 mg. of piperidine hydrochloride. The mixture was refluxed for 2 hours and then distilled to give 0.9 g. of 2-ethyl-4-acetyl-7-(2,3-epoxypropoxy)benzofuran. 0.4 g. of the product thus obtained and 0.2 g. of isopropylamine were added to 4 ml. of ethanol. After refluxing the mixture for 20 minutes, the solvent was evaporated under a reduced pressure. The resulting residue was recrystallized from cyclohexane containing a small amount of acetone to give 0.4 g. of 2-ethyl-4-acetyl-7-(2-hydroxy-3-isopropylaminopropoxy)benzofuran having a melting point of 115°C.

Analysis for $C_{18}H_{25}O_4N$:
Calcd. (%): C 67.69, H 7.89, N 4.39;
Found (%): C 67.49, H 7.86, N 4.32.

The 2-ethyl-4-acetyl-7-(2-hydroxy-3-isopropylaminopropoxy)benzofuran thus obtained was dissolved in a diluted hydrochloric acid and thereto was added ethanol. The mixture was condensed under a reduced pressure and the resulting residue was recrystallized from ethyl acetate-ethanol to give its hydrochloride having a melting point of 147°C.

Analysis for $C_{18}H_{25}O_4N \cdot HCl$:
Calcd. (%): C 60.75, H 7.36, N 3.94;
Found (%): C 60.61, H 7.51, N 3.99.

The starting 2-ethyl-4-acetyl-7-hydroxybenzofuran was prepared as follows:

To 15 ml. of chlorobenzene was dissolved 1.5 g. of 2-ethyl-4-acetyl-7-methoxybenzofuran (Bull. Soc. Chim. France, 1971, page 2072) and thereto was gradually added with agitation 2 g. of finely divided anhydrous aluminum chloride at a room temperature. The mixture was heated at 70° to 80°C. for 2 hours. To the reaction mixture were added a diluted hydrochloric acid and ice. The precipitated crystallines were separated by filtration and recrystallized from benzene to give 1 g. of the desired product having a melting point of 156° to 157°C.

EXAMPLE 11

To 13 ml. of ethanol were added 1.3 g. of 2-ethyl-4-acetyl-7-(2,3-epoxypropoxy)benzofuran prepared in the same manner as described in Example 10 and 0.7 g. of tert.-butylamine. After refluxing the mixture for 20 minutes, the solvent was evaporated under a reduced pressure. The resulting residue was recrystallized from cyclohexane containing a small amount of acetone to give 1.4 g. of 2-ethyl-4-acetyl-7-(2-hydroxy-3-tert.-butylaminopropoxy)benzofuran having a melting point of 119°C.

The product thus obtained was treated hydrochloric acid in the same manner as described in Example 10 and the resulting crude crystallines were recrystallized from ethyl acetate-ethanol to give its hydrochloride having a melting point of 171°C.

Analysis for $C_{19}H_{27}O_4N \cdot HCl$:
Calcd. (%): C 61.70, H 7.63, N 3.79;
Found (%): C 61.58, H 7.55, N 3.86.

EXAMPLE 12

In 15 ml. of epichlorohydrin was dissolved 0.9 g. of 2-ethyl-4-propionyl-7-hydroxybenzofuran and thereto was added 50 mg. of piperidine hydrochloride. The mixture was refluxed for 2 hours and then distilled to give 0.8 g. of 2-ethyl-4-propionyl-7-(2,3-epoxypropoxy)-benzofuran. The product thus obtained and 0.65 g. of isopropylamine were added to 10 ml. of ethanol. After refluxing the mixture for 20 minutes, the solvent was evaporated under a reduced pressure. The resulting residue was recrystallized from cyclohexane to give 0.8 g. of 2-ethyl-4-propionyl-7-(2-hydroxy-3-isopropylaminopropoxy)benzofuran having a melting point of 100°C.

Analysis for $C_{19}H_{27}O_4N$:
Calcd. (%): C 68.44, H 8.16, N 4.20;
Found (%): C 68.57, H 8.12, N 4.27.

EXAMPLE 13

To 10 ml. of ethanol were added 1 g. of 2-ethyl-4-propionyl-7-(2,3-epoxypropoxy)benzofuran prepared in the same manner as described in Example 12 and 0.8 g. of sec.-butylamine. After refluxing the mixture for 20 minutes, the solvent was evaporated under a reduced pressure. The resulting residue was recrystallized from cyclohexane to give 0.9 g. of 2-ethyl-4-propionyl-7-(2-hydroxy-3-sec.-butylaminopropoxy)benzofuran having a melting point of 94°C.

Analysis for $C_{20}H_{29}O_4N$:
Calcd. (%): C 69.13, H 8.41, N 4.03;
Found (%): C 68.97, H 8.36, N 4.15.

EXAMPLE 14

In 13 ml. of epichlorohydrin was dissolved 0.8 g. of 2-ethyl-4-benzoyl-7-hydroxybenzofuran and thereto was added 40 mg. of piperidine hydrochloride. After refluxing the mixture for 2 hours, the reaction mixture was distilled under a reduced pressure to give 0.8 g. of 2-ethyl-4-benzoyl-7-(2,3-epoxypropoxy)benzofuran. The product thus obtained and 0.6 g. of isopropylamine were added to 10 ml. of ethanol. After refluxing the mixture for 20 minutes, the solvent was evaporated under a reduced pressure. The resulting residue was recrystallized from cyclohexane to give 0.7 g. of 2-ethyl-4-benzoyl-7-(2-hydroxy-3-isopropylaminopropoxy)-benzofuran having a melting point of 94°C.

Analysis for $C_{23}H_{27}O_4N$:
Calcd. (%): C 72.42, H 7.13, N 3.67;
Found (%): C 72.27, H 7.11, N 3.75.

EXAMPLE 15

To 10 ml. of ethanol were added 1 g. of 2-ethyl-4-benzoyl-7-(2,3-epoxypropoxy)benzofuran prepared in the same manner as described in Example 14 and 0.7 g. of tert.-butylamine. After refluxing the mixture for 20 minutes, the solvent was evaporated under a reduced pressure. The resulting redidue was treated with hydrochloric acid in the same manner as described in Example 10. The precipitated crude crystallines were recrystallized from ethyl acetate-ethanol to give 1.2 g. of 2-ethyl-4-benzoyl-7-(2-hydroxy-3-tert.-butylaminopropoxy)benzofuran hydrochloride having a melting point of 182°C.

Analysis for $C_{24}H_{29}O_4N \cdot HCl$:
Calcd. (%) C 66.74, H 7.00, N (%): 3.24;
Found (%): C 66.85, H 6.91, N 3.35.

EXAMPLE 16

In 15 ml. of epichlorohydrin was dissolved 0.84 g. of 2-ethyl-4-phenylacetyl-7-hydroxybenzofuran and thereto was added 50 mg. of piperidine hydrochloride. After refluxing the mixture for 2 hours, the reaction mixture was distilled under a reduced pressure. The resulting residue was dissolved in ether. The ether layer was taken out and ether was evaporated to give 0.7 g. of 2-ethyl-4-phenylacetyl-7-(2,3-epoxypropoxy)benzofuran. The product thus obtained and 0.5 g. of isopropylamine were added to 10 ml. of ethanol. After refluxing the mixture for 20 minutes, the solvent was evaporated under a reduced pressure. The resulting residue was recrystallized from cyclohexaneacetone to give 0.6 g. of 2-ethyl-4-phenylacetyl-7-(2-hydroxy-3-isopropylaminopropoxy)benzofuran having a melting point of 127°C.

Analysis for $C_{24}H_{29}O_4N$:
Calcd. (%): C 72.88, H 7.39, N 3.54;
Found (%): C 72.95, H 7.31, N 3.45.

EXAMPLE 17

To 10 ml. of ethanol were added 1 g. of 2-ethyl-4-phenylacetyl-7-(2,3-epoxypropoxy)benzofuran and 0.7 g. of sec.-butylamine. After refluxing the mixture for 20 minutes, the solvent was evaporated under a reduced pressure. The resulting residue was recrystallized from cyclohexane-acetone to give 0.95 g. of 2-ethyl-4-phenylacetyl-7-(2-hydroxy-3-sec.-butylaminopropoxy)-benzofuran having a melting point of 126°C.

Analysis for $C_{25}H_{31}O_4N$:
Calcd. (%): C 73.32, H 7.63, N 3.43;
Found (%): C 73.51, H 7.56, N 3.33.

EXAMPLE 18

In 40 ml. of epichlorohydrin was dissolved 4 g. of 2-ethyl-4-acetyl-5-hydroxybenzofuran and thereto was added 0.1 g. of piperidine hydrochloride. After refluxing the mixture for 4 hours, the reaction mixture was distilled under a reduced pressure. The resulting residue was extracted with ether. From the ether layer, ether was evaporated and the residue was washed with petroleum ether to give 4.2 g. of 2-ethyl-4-acetyl-5-(2,3-epoxypropoxy)benzofuran. 1.5 g. of the product thus obtained and 1 g. of tert.-butylamine were added to 20 ml. of ethanol. After refluxing the mixture for 20 minutes, the solvent was evaporated under a reduced pressure. The resulting residue was extracted with a diluted hydrochloric acid. The extract was made alkaline with a diluted aqueous sodium hydroxide solution. The resulting oily substance was extracted with ether. From the ether layer, ether was evaporated to give 1.2 g. of oily substance. The oily substance was dissolved in a diluted hydrochloric acid and thereto was added ethanol. After condensing the mixture under a reduced pressure, the resulting residue was recrystallized from ethyl acetate-ether to give 1.2 g. of 2-ethyl-4-acetyl-5-(2-hydroxy-3-tert.-butylaminopropoxy)benzofuran hydrochloride having a melting point of 149°C.

Analysis for $C_{19}H_{27}O_4N \cdot HCl$:
Calcd. (%): C 61.70, H 7.63, N 3.79;
Found (%): C 61.53, H 7.58, N 3.65.

The starting 2-ethyl-4-acetyl-5-hydroxybenzofuran was prepared as follows:

In 30 ml. of carbon disulfide was dissolved 3.3 g. of 2-ethyl-5-n-butoxybenzofuran and thereto was added 1.35 g. of acetyl chloride. After being further added 4.7 g. of anhydrous tin tetrachloride at 0° to 5°C., the mixture was reacted at a room temperature for 3 hours, and then the solvent was evaporated. The resulting residue was dissolved in 30 ml. of chlorobenzene and thereto was added 3.2 g. of anhydrous aluminum chloride at a room temperature. The mixture was warmed at 40° to 50°C. for 2 hours. To the reaction mixture was added a cold diluted hydrochloric acid and then the mixture was extracted with ether. The ether layer was separated, dried and then ether was evaporated under a reduced pressure. To the resulting residue was added hot petroleum ether and extracted therewith. The petroleum ether layer was cooled to give 0.6 g. of the desired product having a melting point of 119.5° to 121.5°C.

EXAMPLE 19

In 12 ml. of epichlorohydrin was dissolved 1 g. of 2-ethyl-4-benzoyl-5-hydroxybenzofuran and thereto was added 70 mg. of piperidine hydrochloride. After refluxing the mixture for 3 hours, the reaction mixture was distilled under a reduced pressure. The resulting residue was extracted with ether. From the ether layer, ether was evaporated to give 1.2 g. of 2-ethyl-4-benzoyl-5-(2,3-epoxypropoxy)benzofuran as an oily substance. 1 g. of the product thus obtained and 0.7 g. of isopropylamine were added to 10 ml. of ethanol. After refluxing the mixture for 30 minutes, the solvent was evaporated under a reduced pressure. The resulting residue was recrystallized from cyclohexane to give 0.8 g. of 2-ethyl-4-benzoyl-5-(2-hydroxy-3-isopropylaminopropoxy)benzofuran having a melting point of 106°C.

Analysis for $C_{23}H_{27}O_4N$:
Calcd. (%): C 77.42, H 7.13, N 3.67;
Found (%): C 77.57, H 7.21, N 3.58.

EXAMPLE 20

To 2 g. of 2-ethyl-3-acetyl-7-hydroxybenzofuran were added 40 ml. of epichlorohydrin and 0.1 g. of piperidine hydrochloride. After refluxing the mixture for 2 hours, the reaction mixture was subjected to distillation under a reduced pressure to give 2.8 g. of crude 2-ethyl-3-acetyl-7-(2,3-epoxypropoxy)benzofuran. The product thus obtained and 7 ml. of tert.-butylamine were added to 20 ml. of ethanol. After refluxing the mixture for 30 minutes, the solvent was evaporated under a reduced pressure. The resulting residue was recrystallized from petroleum ether to give 1.2 g. of 2-ethyl-3-acetyl-7-(2-hydroxy-3-tert.-butylaminopropoxy)benzofuran having a melting point of 97° to 98°C.

Analysis for $C_{19}H_{27}O_4N$:
Calcd. (%): C 68.44, H 8.16, N 4.20;
Found (%): C 68.58, H 8.11, N 4.09.

The starting 2-ethyl-3-acetyl-7-hydroxybenzofuran was prepared as follows:

In 70 ml. of anhydrous carbon disulfide was dissolved 4.5 g. of 2-ethyl-7-acetoxybenzofuran, and thereto were further added 2 g. of acetyl chloride and 7 g. of anhydrous tin tetrachloride. The mixture was reacted at a room temperature for 2 hours. To the reaction mixture was added a cold diluted hydrochloric acid to hydrolyze. The organic layer was collected and dried, and then the solvent was evaporated to give 3 g. of crude 2-ethyl-3-acetyl-7-acetoxybenzofuran. To the product thus obtained was added a diluted aqueous sodium hydroxide solution to hydrolyze with warming and the mixture was made acidic with a diluted hydrochloric acid. The precipitated crystallines were separated by filtration and recrystallized from ethanol to give 2 g. of the desired product having a melting point of 173° to 175°C.

EXAMPLE 21

To 1.5 g. of 2-ethyl-3-acetyl-5-hydroxybenzofuran were added 30 ml. of epichlorohydrin and 0.1 g. of piperidine hydrochloride. After refluxing the mixture for 2 hours, the reaction mixture was distilled under a reduced pressure to give 2.2 g. of crude 2-ethyl-3-acetyl-5-(2,3-epoxypropoxy)benzofuran. The product thus obtained and 5 ml. of tert.-butylamine were added to 15 ml. of ethanol. After refluxing the mixture for 30 minutes, the solvent was evaporated under a reduced pressure. The resulting residue was recrystallized from petroleum ether to give 1 g. of 2-ethyl-3-acetyl-5-(2-hydroxy-3-tert.-butylaminopropoxy)benzofuran having a melting point of 114° to 115°C.

Analysis for $C_{19}H_{27}O_4N$:
Calcd. (%): C 68.44, H 8.16, N 4.20;
Found (%): C 68.22, H 8.05, N 4.34.

The starting 2-ethyl-3-acetyl-5-hydroxybenzofuran was prepared as follows:

In 20 ml. of anhydrous carbon disulfide was dissolved 2 g. of 2-ethyl-5-acetoxybenzofuran, and thereto were further added 0.9 g. of acetyl chloride and 3 g. of anhydrous tin tetrachloride. The mixture was reacted at a room temperature for 5 hours. To the reaction mixture was added a cold diluted hydrochloric acid to hydrolyze. The organic layer was taken out and dried, and then the solvent was evaporated to give 1.9 g. of crude 2-ethyl-3-acetyl-5-acetoxybenzofuran. To the product thus obtained was added a diluted aqueous sodium hydroxide solution to hydrolyze with warming and the mixture was made acidic with a diluted hydrochloric acid. The precipitated crystallines were separated by filtration and recrystallized from ethanol to give 1.5 g. of the desired product having a melting point of 177° to 178°C.

EXAMPLE 22

A mixture of 214 mg. of potassium salt of 2-acetyl-7-hydroxybenzofuran, 70 mg. of isopropylamine and 0.8 ml. of epichlorohydrin was suspended into 5 ml. of ethanol. After heating the suspension in a sealed tube at 100°C. for 20 hours, the reaction mixture was filtered and then the solvent was evaporated under a reduced pressure. The residue was subjected to thin layer chromatography (solid support: Kieselgel $PF_{254}$ made by E. Merck, developer: benzene-chloroform-methanol-28% aqueous ammonia(17:4:3:0.4), eluant: chloroform) for the purification to give 2-acetyl-7-(2-hydroxy-3-isopropylaminopropoxy)benzofuran having a melting point of 115°C.

EXAMPLE 23

A mixture of 1.1 g. of 2-acetyl-7-hydroxybenzofuran, 8 ml. of epichlorohydrin and 12.5 mg. of piperidine hydrochloride was heated at 105°C. for 3 hours. The reaction mixture was condensed under a reduced pressure and dissolved in chloroform. The solution was washed with a diluted hydrochloric acid and then the solvent was evaporated to give 1.3 g. of 2-acetyl-7-(2-hydroxy-3-chloropropoxy)benzofuran. 1 g. of the product thus obtained was dissolved in 24 ml. of isopropylamine. The mixture was heated in a sealed tube at 100°C. for 12 hours. The reaction mixture was extracted with ether and the ether layer was washed with a diluted aqueous sodium hydroxide solution and then the solvent was evaporated under a reduced pressure. The resulting residue was recrystallized from cyclohexane to give 1 g. of 2-(1-isopropylimino)ethyl-7-(2-hydroxy-3-isopropylaminopropoxy)-benzofuran having a melting point of 103°C.

Analysis for $C_{19}H_{28}O_3N_2$:
Calcd. (%): C 68.64, H 8.49, N 8.43;
Found (%): C 68.40, H 8.22, N 8.42.

EXAMPLE 24

A mixture of 1.8 of 2-acetyl-4-hydroxybenzofuran, 18 ml. of epichlorohydrin and 100 mg. of piperidine hydrochloride was refluxed for 4 hours. After the reaction, the solvent was evaporated under a reduced pressure. The resultant was shaken with 3 ml. of concentrated hydrochloric acid and 10 ml. of chloroform and washed with water and the chloroform layer was concentrated to give 1.4 g. of 2-acetyl-4-(2-hydroxy-3-chloropropoxy)benzofuran. The product thus obtained was dissolved in 50 ml. of isopropylamine. The solution was heated in a sealed tube at 105°C. for 14 hours and then the excess of isopropylamine was evaporated. After collecting the materials dissolved into ether from the residue, the ether was evaporated. The resulting residue was recrystallized from cyclohexane to give 1.3 g. of 2-(1-isopropylimino)ethyl-4-(2-hydroxy-3-isopropylaminopropoxy)benzofuran having a melting point of 120°C.

Analysis for $C_{19}H_{28}O_3N_2$:
Calcd (%): C 68.64, H 8.49, N 8.43;
Found (%): C 68.90, H 8.26, N 8.40.

EXAMPLE 25

In 50 ml. of sec.-butylamine was dissolved 1.4 g. of 2-acetyl-4-(2-hydroxy-3-chloropropoxy)benzofuran prepared in the same manner as described in Example 24. The solution was heated in a sealed tube at 105°C. for 14 hours and then the excess of sec.-butylamine was evaporated. After collecting the materials dissolved into ether from the residue, ether was evaporated. The resulting residue was recrystallized from petroleum ether to give 1.3 g. of 2-(1-sec.-butylimino)ethyl-4-(2-hydroxy-3-sec.-butylaminopropoxy)benzofuran having a melting point of 88°C.

Analysis for $C_{21}H_{32}O_3N_2$:
Calcd. (%): C 69.97, H 8.95, N 7.77;
Found (%): C 69.69, H 8.87, N 7.91.

EXAMPLE 26

A mixture of 1.8 g. of 2-acetyl-5-hydroxybenzofuran, 18 ml. of epichlorohydrin and 100 mg. of piperidine hydrochloride was refluxed for 4 hours and then the solvent was evaporated. After collecting the materials dissolved into ether from the residue, ether was evaporated. The resultant was shaken with 10 ml. of chloroform and 3 ml. of concentrated hydrochloric acid and washed with water. The chloroform layer was condensed to give 1.4 g. of 2-acetyl-5-(2-hydroxy-3-chloropropoxy)benzofuran. The product thus obtained was dissolved in 50 ml. of isopropylamine. The solution was heated in a sealed tube at 105°C. for 14 hours and then the excess of isopropylamine was evaporated. After collecting the materials dissolved into ether from the residue, ether was evaporated. The resulting residue was recrystallized from petroleum ether to give 1 g. of 2-(1-isopropylimino)ethyl-5-(2-hydroxy-3-isopropylaminopropoxy)benzofuran having a melting point of 75°C.

Analysis for $C_{19}H_{28}O_3N_2$:
Calcd. (%): C 68.64, H 8.49, N 8.43;
Found (%): C 68.50, H 8.52, N 8.21.

EXAMPLE 27

A mixture of 1.8 g. of 2-acetyl-6-hydroxybenzofuran, 18 ml. of epichlorohydrin and 100 mg. of piperidine hydrochloride was refluxed for 4 hours and then the solvent was evaporated. The resultant was shaken with 10 ml. of chloroform and 3 ml. of concentrated hydrochloric acid and washed with water. The chloroform layer was condensed to give 1.4 g. of 2-acetyl-6-(2-hydroxy-3-chloropropoxy)benzofuran. The product thus obtained was dissolved in 50 ml. of sec.-butylamine and the solution was heated in a sealed tube at 105°C. for 14 hours and then the excess of sec.-butylamine was evaporated. After collecting the materials dissolved into ether from the residue, ether was evaporated to give 1.1 g. of 2-(1-sec.-butylimino)ethyl-6-(2-hydroxy-3-sec.-butylaminopropoxy)benzofuran as an oily substance.

Analysis for $C_{21}H_{32}O_3N_2$:
Calcd. (%): C 69.97, H 8.95, N 7.77;
Found (%): C 69.75, H 8.84, N 7.86.

EXAMPLE 28

In 26 ml. of n-amylamine was dissolved 1.3 g. of 2-acetyl-5-(2-hydroxy-3-chloropropoxy)benzofuran prepared in the same manner as described in Example 26 and the solution was heated in a sealed tube at 110°C. for 12 hours and then the excess of amylamine was evaporated under a reduced pressure. After collecting the materials dissolved into hot petroleum ether, the petroleum ether layer was cooled to give 1.3 g. of 2-(1-amylimino)ethyl-5-(2-hydroxy-3-amylaminopropoxy)-benzofuran having a melting point of 70°C.

Analysis for $C_{23}H_{36}O_3N_2$:
Calcd. (%): C 71.10, H 9.34, N 7.21;
Found (%): C 70.95, H 9.30, N 7.48.

EXAMPLE 29

In 5 ml. of ethanol were dissolved 0.3 g. of 2-acetyl-7-(2-hydroxy-3-aminopropoxy)benzofuran and 1.0 g. of isopropyl bromide. The mixture was refluxed for 8 hours. After filtering the reaction mixture, the filtrate was condensed under a reduced pressure, dissolved in 5 % hydrochloric acid and washed twice with each 30 ml. of ether. The aqueous solution was made alkaline with 1.3 N aqueous sodium hydroxide solution and extracted twice with each 50 ml. of ether. The ether layer was washed with water and dried over anhydrous sodium sulfate, and then the solvent was evaporated under a reduced pressure to give 0.2 g. of yellow oily substance. The substance was allowed to stand to give 0.17 g. of 2-acetyl-7-(2-hydroxy-3-n-propylaminopropoxy)benzofuran having a melting point of 73.5° to 74.5°C.

EXAMPLE 30

To 6 ml. of methanol were added 0.6 g. of 2-acetyl-7-(2-hydroxy-3-aminopropoxy)benzofuran and 0.42 g. of isopropyl bromide. The mixture was heated in a sealed tube at 100°C. for 8 hours. After filtering the reaction mixture, the solvent was evaporated. The resulting residue was dissolved in 10 ml. of 3 N hydrochloric acid. The solution was washed twice with each 30 ml. of ether, made alkaline with 1.3 N aqueous sodium hydroxide solution and extracted three times with chloroform-ether. The solvent was evaporated from the extract under a reduced pressure to give 0.57 g. of faint yellow oily substance. The substance was allowed to stand to give 0.53 g. of 2-acetyl-7-(2-hydroxy-3-isopropylaminopropoxy)benzofuran having a melting point of 113° to 115°C.

EXAMPLE 31

To 2 ml. of ethanol were added 120 mg. of 2-acetyl-7-hydroxybenzofuran, 120 mg. of 1-isopropylamino-3-chloro-2-propanol hydrochloride and 84 mg. of powdery sodium hydroxide. The mixture was heated in a sealed tube at 70°C. for 40 hours. After filtering the reaction mixture, the solvent was evaporated under a reduced pressure. The residue was washed with 10 ml. of cyclohexane and then 10 ml. of petroleum ether in order and dissolved in 1 ml. of ethyl acetate. The solution was subjected to thin layer chromatography (solid support : Kieselgel $PF_{254}$ made by E. Merck, developer : benzene-chloroform-methanol-28% aqueous ammonia(17:4:3:0.4), eluant: chloroform) to give 31 mg. of 2-acetyl-7-(2-hydroxy-3-isopropyl-aminopropoxy)benzofuran having a melting point of 113° to 115°C.

EXAMPLE 32

In 2 ml. of dimethylformamide was dissolved 0.12 g. of 2-acetyl-7-hydroxybenzofuran and thereto was added 0.42 g. of potassium carbonate. To the mixture was added 0.18 g. of 1-isopropylamino-2-hydroxy-3--chloropropane hydrochloride in portions (5times) over 1 hour with agitation at 80° to 100°C., and the mixture was heated with agitation at 80° to 100°C. for 8 hours. The reaction mixture was filtered and distilled under a reduced pressure. The residue was extracted with chloroform. The chloroform layer was separated and chloroform was evaporated. The residue was dissolved in 50 ml. of ether and then extracted with 3 N hydrochloric acid. The extract was made alkaline with 1.3 N aqueous sodium hydroxide solution and extracted with chloroform. The chloroform layer was washed with water, dried over anhydrous sodium sulfate and then the solvent was condensed. The resultant was subjected to thin layer chromatography (solid support: Kieselgel $PF_{254}$ made by E. Merck, developer: benzene-chloroform-methanol-28 % aqueous ammonia(17:4:3:0.4), eluate; chloroform) to give 29 mg. of 2-acetyl-7-(2-hydroxy-3-isopropylaminopropoxy)-benzofuran having a melting point of 113° to 115°C.

EXAMPLE 33

In a mixture of 1 ml. of acetone and 2 ml. of methanol was dissolved 0.2 g. of 2-(1-ethylenedioxy)-ethyl-7-(2-hydroxy-3-aminopropoxy)benzofuran. To the mixture were added in portions 0.2 g. of sodium borohydride with agitation under cooling and further 3 drops of acetic acid and 5 drops of concentrated hydrochloric acid in order. After filtering the mixture, the filtrate was distilled under a reduced pressure to give faint yellow crystallines. The product thus obtained was dissolved in ethyl acetate-methanol (2:1). The solution was filtered, distilled under a reduced pressure, made alkaline with 3 N aqueous sodium hydroxide solution and then extracted with ether. The ether layer was dried over anhydrous sodium sulfate and ether was evaporated to give 0.15 g. of 2-acetyl-7-(2-hydroxy-3-isopropylaminopropoxy)-benzofuran having a melting point of 115°C.

EXAMPLE 34

In 30 ml. of methanol was dissolved 1.0 g. of 2-(1-ethylenedioxy)ethyl-7-(2-hydroxy-3-aminopropoxy)-benzofuran and thereto were added 10 ml. of acetone and 0.8 g. of 5% palladium-charcoal. To the mixture was added hydrogen gas at a room temperature under atmospheric pressure until theoretical amount of hydrogen was absorbed. The reaction mixture was filtered and distilled under a reduced pressure to give 1.0 g. of faint yellow oily substance. The substance was dissolved in 20 ml. of ethanol and thereto was added 0.1 ml. of concentrated hydrochloric acid. The mixture was agitated at a room temperature for 30 minutes and then the solvent was evaporated under a reduced pressure. To the residue was added 5 ml. of 3 N hydrochloric acid and the mixture was extracted with ether, made alkaline with 1.3 N aqueous sodium hydroxide solution and extracted twice with ether-chloroform (1:1). The solvent was evaporated to give 0.97 g. of 2-acetyl-7-(2-hydroxy-3-isopropylaminopropoxy)-benzofuran having a melting point of 113° to 115°C.

EXAMPLE 35

A mixture of 1.0 g. of 3-isopropyl-5-(2-acetyl-7-benzofuranoxymethyl)oxazolidone and 10 ml. of 10 N aqueous sodium hydroxide solution was heated with agitation at 150°C. for 30 minutes. To the reaction mixture was added 100 ml. of water and the mixture was made slightly alkaline with a diluted hydrochloric acid and extracted with chloroformether. The organic layer was dried over anhydrous sodium sulfate and the solvent was evaporated under a reduced pressure to give 0.6 g. of 2-acetyl-7-(2-hydroxy-3-isopropylaminopropoxy)benzofuran having a melting point of 113° to 115°C.

EXAMPLE 36

To 10 ml. of 10% hydrochloric acid was added 1.0 g. of 2-phenyl-3-isopropyl-5-(2-acetyl-7-benzofuranoxymethyl)oxazolidine and the mixture was heated at 90° to 95°C. for 1 hour. After cooling, the reaction mixture was made alkaline with 1.3 N aqueous sodium hydroxide solution and extracted with ether-chloroform. The organic layer was washed with water, dried over anhydrous sodium sulfate and the solvent was evaporated under a reduced pressure to give 0.9 g. of 2-acetyl-7-(2-hydroxy-3-isopropylaminopropoxy)-benzofuran having a melting point of 113° to 115°C.

EXAMPLE 37

A mixture of 2.0 g. of 2-acetyl-7-[2-hydroxy-3N-acetyl-N-isopropyl)aminopropoxy]benzofuran and 10 ml. of 2 N hydrochloric acid was heated at 70° to 80°C. for 2 hours. After cooling, the reaction mixture was washed with ether, made alkaline with 1.3 N aqueous sodium hydroxide solution and extracted with ether-chloroform. The organic layer was washed with water, dried over anhydrous sodium sulfate and the solvent was evaporated under a reduced pressure to give 1.92 g. of 2-acetyl-7-(2-hydroxy-3-isopropylaminopropoxy)benzofuran having a melting point of 113° to 115°C.

EXAMPLE 38

In 10 ml. of 10% aqueous dioxane was dissolved 1.0 g. of 2-(1-ethylenedioxy)ethyl-7-(2-oxo-3-isopropylaminopropoxy)benzofuran and thereto was added in portions 100 mg. of sodium borohydride with agitation under cooling. The mixture was reacted at a room temperature for 30 minutes and thereto was added 4 drops of acetic acid. After filtration, 4 drops of concentrated hydrochloric acid was added to the filtrate and the mixture was agitated at a room temperature for 15 minutes and then the solvent was evaporated under a reduced pressure. To the residue was added 1.3 N aqueous sodium hydroxide solution to make alkaline and then the mixture was extracted with ether-chloroform. The organic layer was washed with water, dried over anhydrous sodium sulfate and the solvent was evaporated under a reduced pressure. The residue was allowed to stand at a room temperature to give 0.9 g. of 2-acetyl-7-(2-hydroxy-3-isopropylaminopropoxy)benzofuran having a melting point of 113° to 115°C.

EXAMPLE 39

In 30 ml. of ethanol was dissolved 1.0 g. of 2-(1-ethylenedioxy)ethyl-7-[2-hydroxy-3-(N-benzyl-N-isopropyl)aminopropoxy]benzofuran and thereto was added 0.5 g. of 5% palladium-charcoal. To the mixture was added hydrogen gas at a room temperature under atmospheric pressure until theoretical amount of hydrogen gas was absorbed. After filtration, the filtrate was distilled under a reduced pressure to give 0.65 g. of clear oily substance. The substance thus obtained was dissolved in 5 ml. of ethanol and thereto was added 2 drops of concentrated hydrochloric acid. The mixture was agitated at a room temperature for 30 minutes and then the solvent was evaporated under a reduced pressure. To the residue was added 5 ml. of 3 N hydrochloric acid. The mixture was extracted three times with each 15 ml. of ether, made alkaline with 1.3 N aqueous sodium hydroxide solution, extracted twice with each 25 ml. of ether. The solvent was evaporated to give 0.51 g. of 2-acetyl-7-(2-hydroxy-3-isopropylaminopropoxy)benzofuran having a melting point of 113° to 115°C.

EXAMPLE 40

To 20 ml. of ethanol was suspended 0.25 g. of platinum oxide and thereto was added hydrogen gas at a room temperature. To the mixture was added a solution of 0.6 g. of 2-(1-ethylenedioxy)ethyl-7-(2-oxo-3-hydroxyiminopropoxy)benzofuran in 10 ml. of ethanol and 5 ml. of acetone. To the mixture was added with agitation hydrogen gas at a room temperature under atmospheric pressure until theoretical amount of hydrogen was absorbed. After filtration, to the filtrate was added 4 drops of concentrated hydrochloric acid. The mixture was agitated at a room temperature for 15 minutes and then the solvent was evaporated under the reduced pressure. To the residue was added 10 ml. of 0.5 N hydrochloric acid and the mixture was extracted with ether. The aqueous layer was made alkaline with 2 N aqueous sodium hydroxide solution and extracted with ether. The ether layer was washed with water, dried over anhydrous sodium sulfate and the solvent was evaporated under a reduced pressure to give 0.45 g. of 2-acetyl-7-(2-hydroxy-3-isopropylaminopropoxy)-benzofuran having a melting point of 113° to 115°C.

EXAMPLE 41

In 50 ml. of ethanol were dissolved 2.3 g. of 2-(1- ethylenedioxy)ethyl-7-(2,3-dioxopropoxy)benzofuran and 8 g. of isopropylamine. To the mixture was added in portions 1.8 g. of sodium borohydride with agitation at 10°C. over 15 minutes. The mixture was reacted at a room temperature for 1 hour and thereto was added 4 drops of acetic acid. To the mixture was added 150 ml. of 2 N hydrochloric acid and the mixture was extracted with ether. The aqueous layer was neutralized with 1.0 N aqueous sodium hydroxide solution and extracted with ether. The ether layer was washed with water, dried over anhydrous sodium sulfate and the solvent was evaporated under a reduced pressure to give 0.9 g. of 2-acetyl-7-(2-hydroxy-3-isopropylaminopropoxy)benzofuran having a melting point of 113° to 115°C.

EXAMPLE 42

To 30 g. of acetic acid were added 1 g. of 2-(1-ethylenedioxy)ethyl-7-(2-cyano-2-hydroxyethoxy)-benzofuran, 20 g. of acetone and 1.2 g. of 5% palladium-charcoal and thereto was added with agitation hydrogen gas at a room temperature under atmospheric pressure for 24 hours. The mixture was filtered and the solvent was evaporated under a reduced pressure. To the residue was added 40 ml. of 1.3 N aqueous sodium hydroxide solution and the mixture was refluxed for 15 minutes. After cooling, the mixture was extracted with ether-chloroform and the organic layer was washed with water, dried over anhydrous sodium hydroxide solution and the solvent was evaporated under a reduced pressure to give 0.3 g. of 2-acetyl-7-(2-hydroxy-3-isopropylaminopropoxy)benzofuran having a melting point of 113° to 115°C.

EXAMPLE 43

With respect to the present benzofuran derivatives and Propranolol which has been widely used as an adrenergic blocking agent, there was tested isoproterenol antagonism concerning myocardial contractile force, heart rate and diastolic blood pressure in anesthetized dogs (Cf. The Journal of Pharmacology and Experimental Therapeutics, Vol. 176, No. 2, pages 339 to 349, 1971).

The male and female dogs weighing between 9 and 20 kg. were used. Doses of isoproterenol and compounds to be tested were 0.3 µg./kg. and 0.01 to 100 µg./kg., respectively. The results are shown in Table I.

TABLE I

| Compounds[1] to be tested | Myocardial[2] contractile force | Heart[2] rate | Diastolic[2] blood pressure |
|---|---|---|---|
| 1 | 15.9 | 0.04 | 3.1 |
| 2 | 2.7 | 3.7 | 0.9 |
| 3 | 38.0 | 0.05 | 83.3 |
| 4 | 10.3 | 0.3 | 20.3 |
| 5 | 1.9 | 0.02 | 0.3 |
| 6 | 1.6 | 0.02 | 150 |
| 7 | 15.9 | 0.7 | 0.2 |
| Propranolol | 1 | 1 | 1 |

[1] Compound No. 1
2-(1-isopropylimino)ethyl-7-(2-hydroxy-3-isopropylaminopropoxy)benzofuran
Compound No. 2
2-acetyl-4-(2-hydroxy-3-tert.-butylamino-propoxy)benzofuran
Compound No. 3: 2-acetyl-7-(2-hydroxy-3-isopropylamino-propoxy)benzofuran
Compound No. 4
2-acetyl-7-(2-hydroxy-3-tert.-butyl-aminopropoxy)benzofuran
Compound No. 5
2-carbethoxy-7-(2-hydroxy-3-isopropyl-aminopropoxy)benzofuran
Compound No. 6
2-(1-isopropylimino)ethyl-4-(2-hydroxy-3-isopropylaminopropoxy)benzofuran
Compound No. 7
2-acetyl-7-(2-hydroxy-3-sec.-butylamino-propoxy)benzofuran
[2] Index value when the value of Propranolol is 1.

EXAMPLE 44

With respect to the present benzofuran derivatives and Propranolol, there was tested isoproterenol antagonism concerning myocardial contractile force and heart rate in isolated guinea-pig atria (Cf. The Journal of Pharmacology and Experimental Therapeutics, Vol. 168, No. 1, pages 116 to 126, 1969).

Isolated guinea-pig atrium was mounted in a chamber containing Ringer-Locke solution (37°C.), through which 95% $O_2$–5% $CO_2$ was continuously bubbled. 1 × $10^{-8}$ g./ml. of isoproterenol was used. 50% inhibition of isoproterenol responses was investigated. The results are shown in Table II.

Table II

| Compounds* to be tested | Heart rate | | Myocardial contractile force | |
|---|---|---|---|---|
| | $ED_{50}$ (g./ml.) | Relative | $ED_{50}$ (g./ml.) | Relative |
| 1 | $4.2 \times 10^{-9}$ | 8.5 | $3.7 \times 10^{-9}$ | 6.5 |
| 2 | $2.2 \times 10^{-8}$ | 1.6 | $2.6 \times 10^{-8}$ | 0.9 |
| 3 | $2.0 \times 10^{-8}$ | 1.8 | $1.7 \times 10^{-8}$ | 1.4 |
| 4 | $1.6 \times 10^{-8}$ | 2.2 | $1.3 \times 10^{-8}$ | 1.8 |
| 6 | $5.5 \times 10^{-9}$ | 6.5 | $1.9 \times 10^{-8}$ | 1.3 |
| Propranolol | $3.6 \times 10^{-8}$ | 1.0 | $2.4 \times 10^{-8}$ | 1.0 |

* Compound Nos. are the same as defined in Table I.

EXAMPLE 45

Acute toxicity of the present banxofuran derivatives was tested in mice by intravenous injection. The results are shown in Table III.

Table III

| Compounds* | $LD_{50}$ (mg./kg.) |
|---|---|
| 1 | 65 – 70 |
| 2 | 35 – 40 |
| 3 | 100 – 105 |
| 4 | 45 – 55 |
| 5 | 50 – 55 |
| 6 | 45 – 50 |
| 7 | 75 – 80 |
| 8 | 120 – 125 |
| Propranolol | 25 – 30 |

* Compound Nos. 1 to 7 are the same as defined in Table I.
Compound No. 8
2-ethyl-4-acetyl-7-(2-hydroxy-3-isopropylaminopropoxy)benzofuran.

What is claimed is:

1. A benzofuran derivative of the formula:

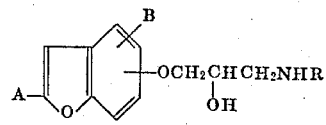

wherein A is —COR',

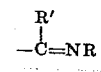

or ethyl; B is hydrogen atom when A is -COR', or

or —COR″ substituted at 3 or 4 position of benzofuran nucleus when A is ethyl; R is alkyl having 1 to 5 carbon atoms; R′ is alkyl having 1 to 4 carbon atoms, alkoxy having 1 to 3 carbon atoms or phenyl group; R″ is alkyl having 1 to 4 carbon atoms, phenyl or phenylalkyl wherein the alkyl moiety has 1 to 2 carbon atoms; and a pharmaceutically acceptable acid addition salt thereof.

2. A benzofuran derivative according to claim 1, wherein R is branched alkyl having 3 to 4 carbon atoms.

3. A benzofuran derivative according to claim 1, wherein A is —COR′.

4. 2-acetyl-7-(2-hydroxy-3-isopropylaminopropyl)-benzofuran.

5. 2-acetyl-7-(2-hydroxy-3-tertiary butylaminopropoxy)benzofuran.

6. 2-carbethoxy-7-(2-hydroxy-3-isopropylaminopropoxy)benzofuran.

7. 2-benzoyl-7-(2-hydroxy-3-isopropylaminopropoxy)benzofuran.

8. 2-acetyl-7-(2-hydroxy-3-secondary butylaminopropoxy)benzofuran.

9. 2-acetyl-4-(2-hydroxy-3-tertiary butylaminopropoxy)benzofuran.

10. 2-(1-isopropylimino)ethyl-7-(2-hydroxy-3-isopropylaminopropoxy)benzofuran.

11. 2-(1-isopropylimino)ethyl-4-(2-hydroxy-3-isopropylaminopropoxy)benzofuran.

12. A benzofuran derivative of the following formula:

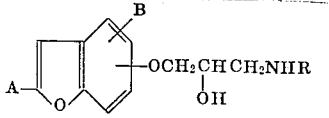

wherein R′ is lower alkyl having 1 to 4 carbon atoms, lower alkoxy having 1 to 3 carbon atoms or phenyl; R is lower alkyl having 1 to 5 carbon atoms and the substituted propoxy group is on the 3, 4, 5, 6 or 7 position of the benzofuran ring; and the acid salts thereof.

13. The hydrochloride salt of the compound of claim 12 wherein R′CO is acetyl; R is isopropyl and the substituted propoxy group is on the 5 position of the benzofuran ring.

14. The benzofuran derivative of claim 12 wherein R′CO is acetyl; R is tertiary butyl and the substituted propoxy group is on the 3 position of the benzofuran ring.

15. The benzofuran derivative of claim 12 wherein R′CO is acetyl; R is tertiary butyl and the substituted propoxy group is on the 6 position of the benzofuran ring.

16. The benzofuran derivative of claim 12 wherein R′CO is acetyl; R is n-propyl and the substituted propoxy group is on the 7 position of the benzofuran ring.

17. The hydrochloride salt of the compound of claim 4.

18. The hydrochloride salt of the compound of claim 5.

19. The hydrochloride salt of the compound of claim 9.

20. The hydrochloride salt of the compound of claim 6.

21. The benzofuran derivative of claim 12 selected from the group consisting of:
1. 2-acetyl-7-(2-hydroxy-3-isopropylaminopropoxy)-benzofuran and its hydrochloride;
2. 2-acetyl-7-(2-hydroxy-3-tert.-butylaminopropoxy)benzofuran and its hydrochloride;
3. 2-acetyl-4-(2-hydroxy-3-tert.-butylaminopropoxy)benzofuran and its hydrochloride;
4. 2-carbethoxy-7-(2-hydroxy-3-isopropylaminopropoxy)benzofuran and its hydrochloride;
5. 2-benzoyl-7-(2-hydroxy-3-isopropylaminopropoxy)benzofuran;
6. 2-acetyl-5-(2-hydroxy-3-isopropylaminopropoxy)-benzofuran hydrochloride;
7. 2-acetyl-7-(2-hydroxy-sec.-butylaminopropoxy)-benzofuran;
8. 2-acetyl-3-(2-hydroxy-3-tert.-butylaminopropoxy)benzofuran;
9. 2-acetyl-6-(2-hydroxy-3-tert.-butylaminopropoxy)benzofuran; and
10. 2-acetyl-7-(2-hydroxy-3-n-propylaminopropoxy)benzofuran.

* * * * *

UNITED STATES PATENT OFFICE
CERTIFICATE OF CORRECTION

PATENT NO. : 3,853,923
DATED : DECEMBER 10, 1974
INVENTOR(S) : KIYOSHI ITO et al

It is certified that error appears in the above-identified patent and that said Letters Patent are hereby corrected as shown below:

Column 6, line 4, change "anesthetic acitvit" to --- anesthetic activity ---.

Column 15, line 41, change "isopropyl bromide" to --- n-propyl bromide ---.

Column 21, Claim 4, change "2-acetyl-7-(2-hydroxy-3-isopropylaminopropyl)-benzofuran" to --- 2-acetyl-7-(2-hydroxy-3-isopropylaminopropoxy)-benzofuran ---.

Column 21, Claim 12, the formula should read as follows:

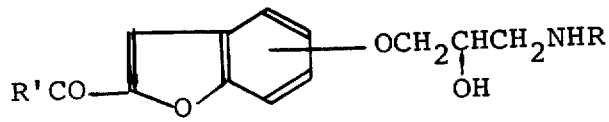

Signed and sealed this 3rd day of June 1975.

(SEAL)
Attest:

RUTH C. MASON
Attesting Officer

C. MARSHALL DANN
Commissioner of Patents
and Trademarks